United States Patent Office 3,349,691
Patented Oct. 31, 1967

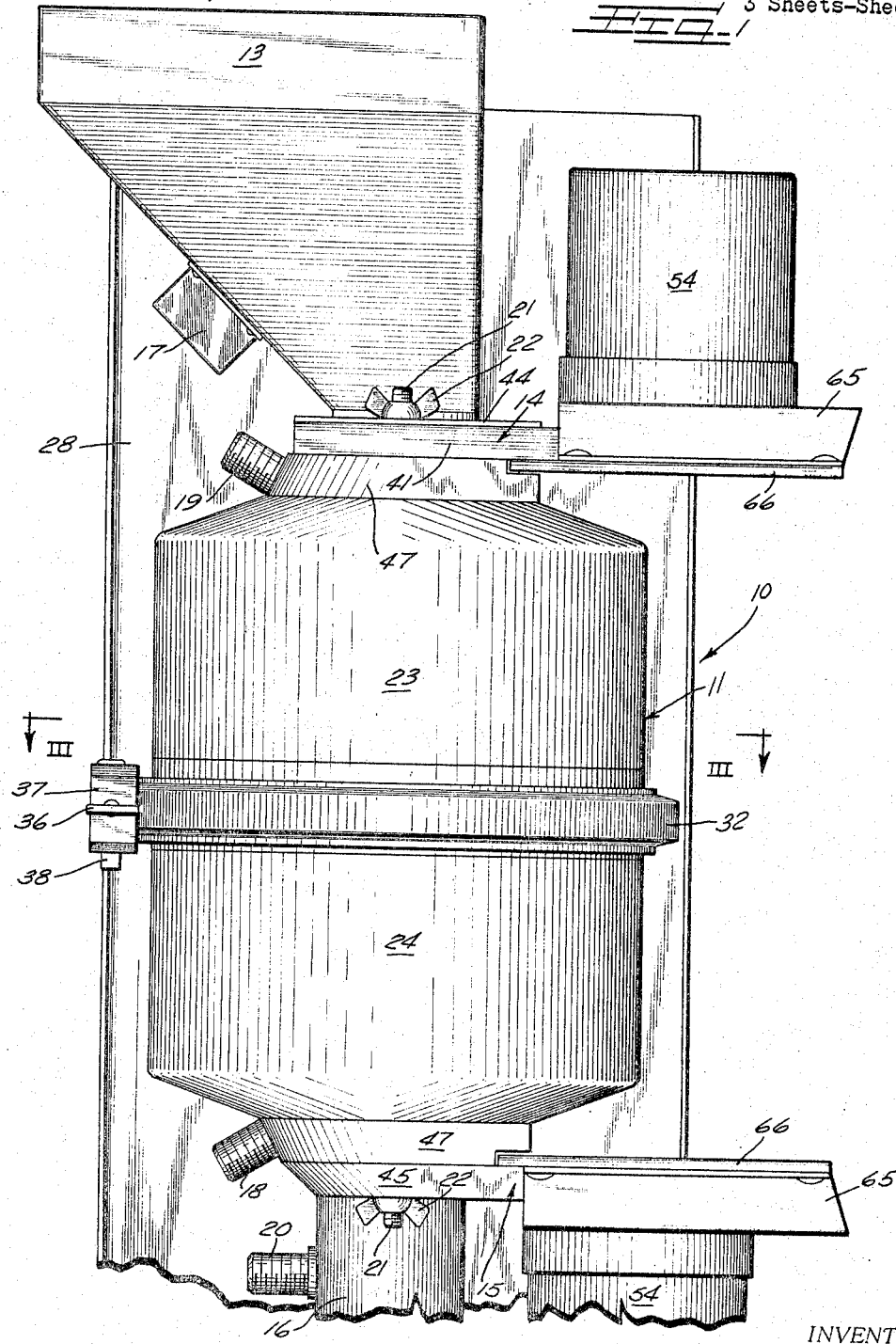

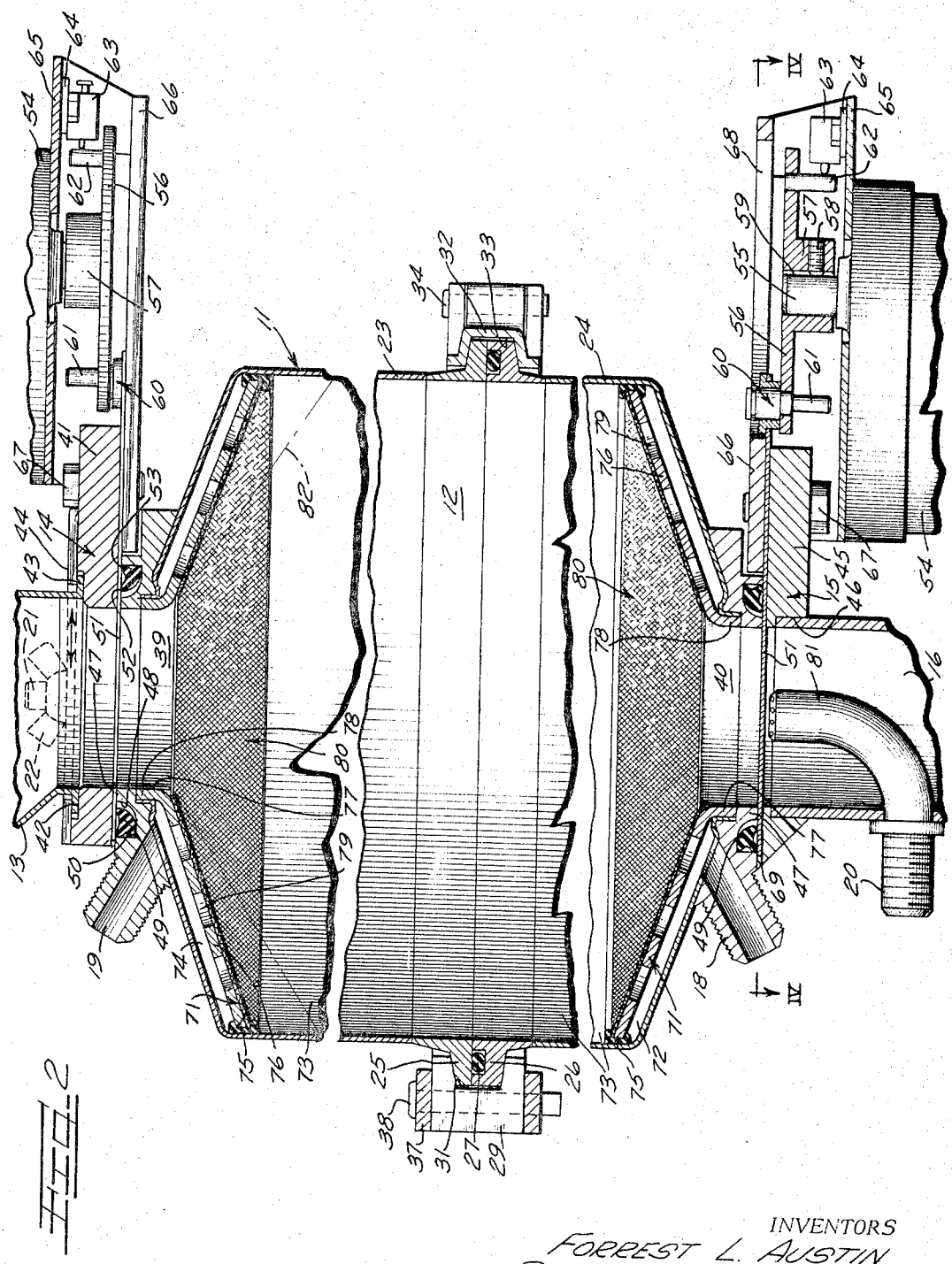

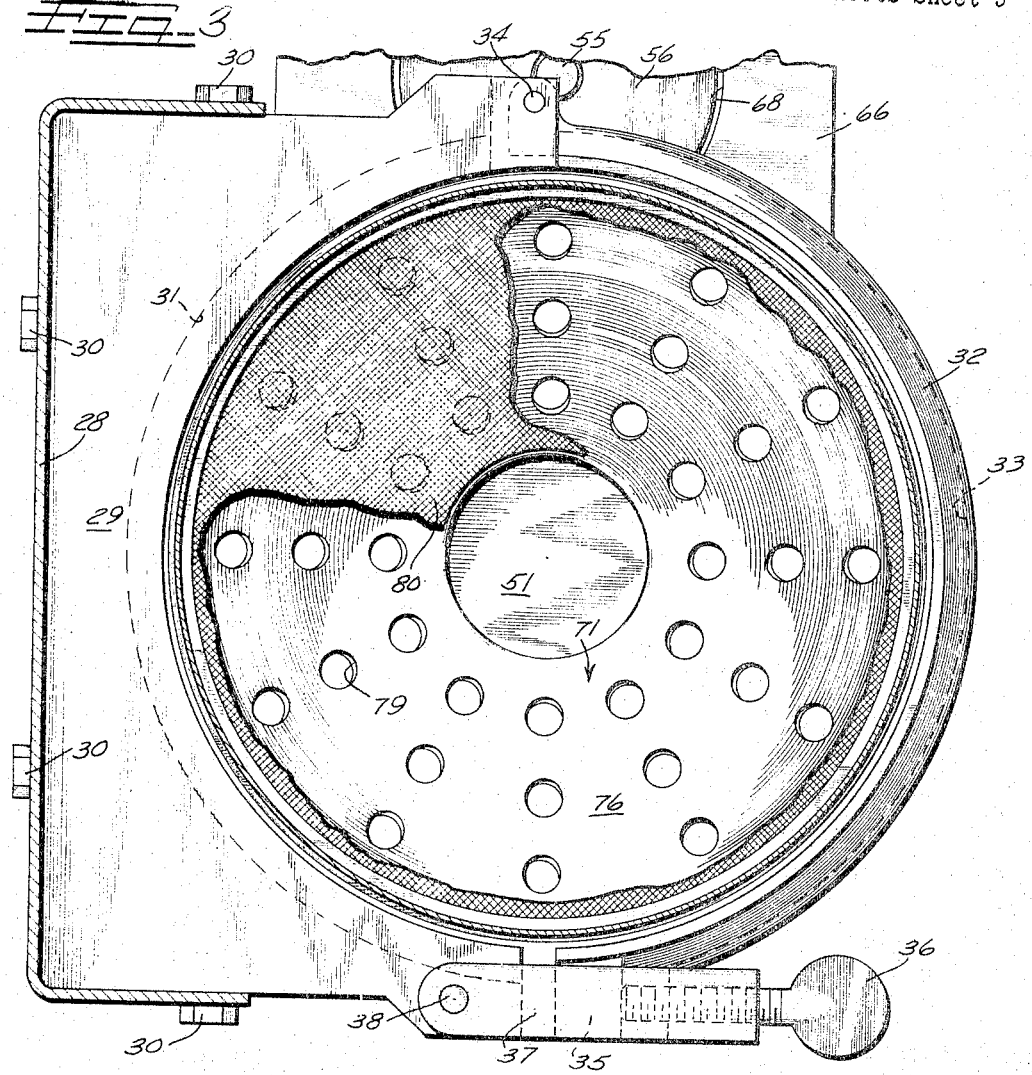
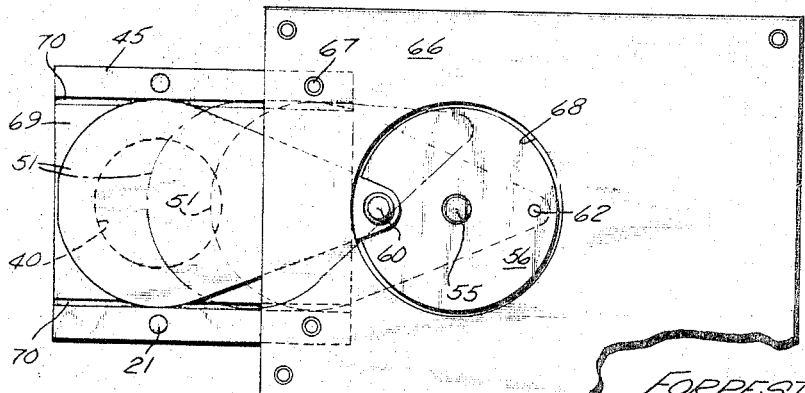

3,349,691
COFFEE-BREWING APPARATUS
Forrest L. Austin, Brooklyn Center, and Richard T. Cornelius, Minneapolis, Minn., assignors to The Cornelius Company, Anoka, Minn., a corporation of Minnesota
Filed June 22, 1965, Ser. No. 465,896
11 Claims. (Cl. 99—289)

ABSTRACT OF THE DISCLOSURE

Coffee-brewing apparatus includes a housing of separable complemental sections having removable internal members which divide the interior into a water distribution chamber, a brewing chamber and an infusion collection chamber. Ground-coffee ports have valves having spurt-free valves, and a waste pipe is connected to the ground-coffee outlet valve and has a nozzle for directing cleansing water upwardly through such valve into the brewing chamber.

---

This invention relates generally to apparatus for making a coffee infusion from ground coffee beans and water, and more specifically to a coffee-brewing apparatus through which water is passed to create the infusion.

Although the principles of the present invention may be included in various coffee brewers, a particularly useful application is made in a coffee brewer which is adapted to produce a large quantity of coffee beverage in a minimum period of time. In particular, when coffee is brewed commercially at a central location the demand can be very high and therefore the time to prepare it should be held to an absolute minimum. Such beverage must be brewed economically both from the standpoint of equipment and labor. So far as we are aware, there is no equipment available which meets these criteria.

The present invention utilizes a chamber that is substantially filled with ground coffee beans and then sealed, and then water of an appropriate temperature is passed through such ground coffee to create an infusion thereof with water. If desired, this infusion may be diluted.

Accordingly, it is an object of the present invention to provide apparatus for making a coffee infusion from ground coffee beans and water.

Another object of the present invention is to provide coffee-brewing apparatus which may be utilized in a substantially completely automatic system.

A further object of the present invention is to provide coffee-brewing apparatus which may be operated by an unskilled worker.

Yet another object of the present invention is to provide coffee-brewing apparatus wherein structural features are embodied that enable one worker to tend several similar devices at the same time.

A still further object of the present invention is to provide coffee-beverage brewing apparatus which produces an improved yield of beverage from the ground coffee beans.

A still further object of the present invention is to provide a coffee-brewing apparatus of the batch-type wherein the amount of ground coffee used per batch is metered to a selectable or adjustable quantity.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 1 is an elevational view of coffee-brewing apparatus provided in accordance with the principles of the present invention;

FIG. 2 is an enlarged cross-sectional view, partially broken away, of the apparatus shown in FIG. 1;

FIG. 3 is an enlarged cross-sectional view, partially broken away, taken along line III—III of FIG. 1; and FIG. 4 is an elevational view of a sub-assembly taken along line IV—IV of FIG. 2.

As shown on the drawings:

The principles of this invention are particularly useful when embodied in an apparatus for making a coffee infusion from ground coffee beans and water, hereafter also referred to as a coffee brewer, such as illustrated in FIG. 1, generally indicated by the numeral 10. The coffee brewer 10 includes a hollow housing 11 within which there is a brewing chamber 12 (FIG. 2), a hopper 13 for ground coffee beans, a first valve assembly 14 for admitting ground coffee to the brewing chamber 12, a second valve assembly 15 through which spent coffee grounds are discharged, and a waste pipe 16.

The hopper 13 is in the nature of a funnel, and may be augmented by a somewhat larger container such as a bin or a bag (not shown) to increase its effective volume. Means are provided to assist the flow of ground coffee from the hopper 13 to the brewing chamber 12, such means being illustrated in this embodiment at 17 as comprising a vibrator which is effective to reciprocate the lower end of the hopper 13 as is described more fully below. The housing 11 is also provided with a water inlet port 18 and an infusion outlet port 19 which communicate with each other through the brewing chamber 12. The waste pipe 16 is provided with a water inlet fitting 20. The housing 11 has a pair of studs 21 at its upper end and a like pair of studs 21 at its lower end which have wing nuts 22 which clamp the valve assemblies 14 and 15 onto the housing 11.

As shown in FIGS. 1–3, the housing 11 comprises a pair of substantially identical housing sections 23, 24, each of which has a peripheral flange 25, 26, the peripheral flange 26 having a groove in which there is disposed a sealing ring or gasket 27 which coacts with the peripheral flange 25 to form a pressure-tight seal therebetween. The coffee brewer 10 is mounted on a channel-shaped member 28 by means of a mounting bracket 29 which is secured by a number of bolts 30 to the channel member 28. The mounting bracket 29 has a groove 31 which receives a portion of the flanges 25, 26. A clamp 32 has a groove 33 corresponding to the groove 31, which receives a further portion of the flanges 25, 26. One end of the clamp 32 is pivoted at 34 on the mounting bracket 29, while the opposite end of the clamp 32 has an ear 35 which is urged by a pivotally supported thumb-screw 36 toward the opposite end of the mounting bracket 29. Each of the grooves 31, 33 tapers divergingly toward the housing 11, and the upper and lower surfaces of the flanges 25, 26 have a corresponding configuration, so that upon tightening of the thumb screw 36, the flanges 25 and 26 are drawn firmly against each other. The thumb screw 36 is carried by a block 37 which is pivotally supported at 38 on the mounting bracket 29. Upon loosening of the thumb screw 36, the block 37 may be pivoted about the axis of the pin 38, thereby enabling pivoting of the clamp about the axis of the pin 34 so that the housing 11 may be withdrawn from the groove 31 in the mounting bracket 29.

As best seen in FIG. 2, the housing 11 has at its upper end or top end a ground-coffee inlet port 39, and remotely therefrom, namely at the bottom thereof, a ground-coffee outlet port 40. The ground-coffee ports 39 and 40 are centrally located to facilitate uniform filling and to facilitate emptying.

The valve assembly 14 includes a base 41 which has an upwardly opening recess 42 within which there is disposed an outwardly turned flange 43 forming a part of the hopper 13. The flange 43 is somewhat smaller than the recess 42 in a horizontal direction so that the lower end of the hopper 13 may move horizontally as indicated by the double arrow, with respect to the housing 11. A split clamp ring 44 retains the flange 43 against vertical movement, and is held in place by the upper wing nuts 22.

The valve assembly 15 has a base 45 with a downwardly directed counterbore 46 within which there is secured the upper end of the waste pipe 16. Subject to these minor difference between the bases 41 and 45, the valve assemblies 14 and 15 are otherwise identical.

The upper surface of the housing 11 and the lower surface of the housing 11 each comprise an annular boss 47, 47 respectively having the ground-coffee ports 39 and 40. Each boss 47 has a groove 48 encircling the ground coffee port 39 or 40, and within which groove 48 there is received a unique circular seal 49. The circular seal 49 is substantially triangular in cross section and coacts between a wall 50 of the groove 48 and a valve 51 having the form of a flat plate which is reciprocably movable in its own plane. Each circular seal 49 has a pair of separate concentric sealing surfaces 52, 53, both of which engage the brewing-chamber side of the valve plate 51, a double seal also being provided against the groove surface 50. Each of the valve assemblies 14, 15 includes an electric motor actuator assembly 54 which has an integral gear train (not shown) which terminates in an output shaft 55. A bell crank or eccentric 56 has a hub 57 which is secured to the shaft 55 by a set screw 58 acting on a flat portion 59 on the shaft 55. The eccentric 56 has a rotatable driving connection 60 with the valve plate 51. The motor is energized and continues to rotate until the eccentric 56 has made one-half a revolution, at which time, one of a pair of pins 61, 62 opens a switch 63 which is electrically in circuit with the motor. The switch 63 is adjustably carried by a screw-mounted bracket 64 which bracket is secured to a motor mounting bracket 65 carried by a plate 66. The plates 66 are each secured by a pair of screws 67 to the base 41 or 45. Each plate 66 has an aperture 68 to accommodate the means 60 by which the eccentric 56 is connected to the slide valve plate 51. Initially the motor 54 is energized independently of the circuit path through the switch 63, until the switch 63 closes when one of the pins 61, 62 has moved away from it. The starting circuit is then deenergized while power is delivered through the switch 63 to the motor 54 until such power is interrupted as described above.

The base 41 has a downwardly directed groove 69 and the base 45 has a similar upwardly directed groove within which the slide valves 51 are disposed, such groove being substantially the thickness of such slide valves 51. This groove is illustrated in elevation in FIG. 4. The groove 69 is undercut at its edges as shown at 70 so that the valve plate 51 may extend the full width of the groove 69 without binding. As seen in FIG. 4, initial rotation of the motor does not uncover the ground-coffee port 40 when the valve 51 is being opened, and upon being moved in a closing direction, the initial rotation has little effect on the position of the valve. Thereby, the valve moves at a fairly high rate at a time that it is uncovering or closing the ground-coffee port 40.

As best seen in FIG. 2, the coffeer brewer 10 includes a pair of members or assemblies 71, 71, each identical to the other, which divide the chamber 12 into a water distribution chamber 72, a brewing chamber 73, and an infusion collection chamber 74. The chambers 72 and 74 are annular and are sealed at their outer peripheries by a pair of gaskets 75, 75 which form a part of the assemblies 71, 71.

In this embodiment, each of the assemblies 71, 71 includes an annular member 76 which has a central opening 77 defined by a tubular portion 78 which extends into the boss 47 in alignment with the ground-coffee ports 39, 40. The portion of the member 76 which surrounds the central opening 77 is prvoided with a group of apertures 79 which communicate the annular chambers 72, 74 with the brewing chamber 73. Each of the groups of apertures 79 is covered by screen means, here comprising a screen 80 of relatively fine mesh which precludes movement of coffee grounds from the chamber 73 to either of the annular chamber 72, 74. We have found that a screen size of 100 mesh is suitable for this purpose.

Thus the screens 80 are annular and have a central opening aligned with the ground-coffee ports. Each of the screens 80 converges or slopes toward the adjacent ground-coffee port 39, 40. In the instance of the lower screen 80, this sloping surface aids in the discharge of spent grounds, and in the instance of the upper screen, the sloped surface defined by the annular means 72 provides a further function described below.

The water inlet 20 is connected to a spray nozzle 81 which is directed to discharge water through the open valve 15, thence upwardly through the ground-coffee outlet port 40 and through the central opening 77 of the lower annular member and throughout the brewing chamber 73.

With at least one of the valve plates 51 closed, ground coffee is introduced into the hopper 13. With the lower valve 51 closed, and with the upper valve 51 open, ground coffee falls by gravity into the brewing chamber 73; such movement is aided by the assisting means or vibrator 17. Such movement preferably continues until the brewing chamber 73 is "full." As ground coffee enters at the central top portion of the brewing chamber 73, it will form a bed or pile which has a conical upper surface, and such surface will rise until it reaches the line indicated at 82. Then the ground-coffee inlet port 39 will fill up, leaving an annular pocket of air between the upper surface of the ground coffee and the lower surface of the upper screen 80. The slope of the screen 80 illustrated is more nearly horizontal than the slope of the upper surface of the coffee bed (line 82), and therefore a controlled amount of expansion space is provided. This expansion space is held sufficiently large so as to assure againt leakage or damage, but is held sufficiently small so as to assure a tightly packed bed of coffee grounds. Thus the means which define the size of the brewing chamber 73 also define a predetermined volume of ground coffee (and expansion space). This volume may be varied or adjusted as described below. As a corollary, this volume also determines the size of each batch of brewed coffee beverage.

The upper valve 51 is then closed. It being very thin, it readily cuts through the ground coffee which fills the ground-coffee inlet port 39. When fully seated, the upper valve 51 thus seals the upper end of the coffee-brewing chamber 73, the lower end being similarly sealed by the other valve 51. Suitable water having a suitable temperature is then admitted under a suitable pressure through the water inlet port 18 to fill the annular water-distribution chamber 72. The water then passes through the group of apertures 79 and the lower screen 80, through the ground coffee in the brewing chambers 73 and expands such coffee to form a tightly packed bed which also serves as a filter medium, and which bed is operative to hold back ground coffee fines, which are even smaller than the mesh size of the upper screen 80, through which the infusion then passes and is collected in the infusion collection chamber 74. The infusion then passes through the infusion outlet 19 to a suitable receiver. In a system for brewing coffee, a water-suppy valve (not shown) is used upstream of the fitting 18. When such valve is closed (after the proper amount of water has passed through the coffee bed) there remains some pressure trapped by the bed and such valve within the brewing chamber 73. If a conventional O-ring were employed in place of the lower sealing ring 49, there would be a spurt of coffee beverage out through the end of the groove 69 when the lower valve plate 51 was retracted. With the present construction, the edge of the valve plate 51 first clears the outer sealing surface 53 while maintaining a seal with the inner surface 52, and as the valve plate is then moving slowly, the outer sealing surface 53 reseats against the bottom of the groove 69 before the central sealing surface 52 is cracked, thereby precluding such spurting. We have found that such spurting has therefore been substantially totally eliminated so that instead of a spurt, at worst a drop may collect.

The pressure is thus retained within the chamber 12 until the lower valve plate is retracted rapidly, and such pressure release assists in breaking up and freeing the coffee bed for discharge into the waste pipe 16. Preferably suitable water for cleansing purposes is caused to flow through the nozzle 81 while the valve plate 51 is being retracted, and such rinse water clears the interior of the brewing chamber 73 of all grounds, and the spent coffee grounds are washed away along with such rinse water. The lower valve 51 is then closed, after which the upper valve 51 may be reopened for brewing the next batch in a like manner. If desired, the valves 51 may be manually operated, but are here shown as being provided with remote actuators to adapt the coffee brewer 10 for use in an automatic system.

The structure described is readily disassembled for maintenance or special cleaning, but such cleaning is not necessary between individual batches. The structure described is not only readily disassemblable and reassemblable for cleaning and maintenance purposes, but is so constructed also for the purpose of altering the size of the batch to be brewed by altering the predetermined volume of ground coffee that is admitted. The present structure is particularly suited to such a selection or adjustment. Once disassembled, either the upper section 23 or the lower section 24 may be replaced by a similar section having a greater or a lesser axial extent as each defines a portion of the brewing chamber 73. The members 71 and 71 are held in place by the frictional engagement between the outer peripheral gaskets 75 and the interior of the housing 11. Either of these assemblies may also be axially withdrawn, and may be replaced by a similar unit wherein the portion 78 has a different axial extent, thereby also altering the predetermined volume of the brewing chamber 73. By a similar substitution the degree of packing or amount of expansion space may also be altered. Not all ground coffee is of equal strength, and not all drinking tastes are uniform, and therefore these variations may be readily accomplished so as to meet the local requirements.

We have found that this apparatus will increase the beverage yield obtained from ground coffee by as much as 50%, and that the total time needed to brew a 5-gallon batch of coffee beverage using this apparatus can be maintained at about 4 minutes per batch.

If desired, the outer surface of the eccentric 56 may be used as a cam to actuate the switch 63.

Although various minor modifications might be suggested by those versed in the art, it should be understood that we wish to embody within the scope of the patent warranted hereon, all such embodiments as reasonably and properly come within the scope of our contribution to the art.

We claim as our invention:

1. Apparatus for making a coffee infusion from roasted ground coffee beans and water, comprising in combination:

(a) a housing having a pressurizable brewing chamber of predetermined size receptive of a predetermined volume of ground coffee;

(b) a ground coffee inlet port disposed centrally at the top of said brewing chamber;

(c) a first valve communicating with said ground coffee inlet port and operative to control flow of ground coffee into said brewing chamber and to seal said ground coffee inlet port;

(d) a ground coffee outlet port leading from said brewing chamber remotely from said ground coffee inlet port;

(e) a second valve communicating with said ground coffee outlet port and operative to control flow of spent coffee grounds out of said brewing chamber and to seal said ground coffee outlet port;

(f) a water inlet port in said housing;

(g) an infusion outlet port in said housing;

(h) a first member removably disposed entirely within said chamber and defining a separate water distribution chamber at one end thereof for communicating said water inlet port with one side of ground coffee in said brewing chamber; and (i) a second member removably disposed entirely within said brewing chamber and defining a separate infusion collection chamber communicating the other side of ground coffee in said brewing chamber with said infusion outlet port.

2. Apparatus according to claim 1, in which said members have apertures to enable the communication with said brewing chamber, first screen means in said brewing chamber covering said apertures of said first member, and second screen means in said brewing chamber covering said apertures of said second member.

3. Apparatus according to claim 2, in which the lower of said screen means and the lower of said apertured members have enlarged openings concentric with said brewing chamber and leading directly to said ground coffee outlet port.

4. Apparatus according to claim 3, in which a waste pipe is connected to said second valve to receive spent coffee grounds therefrom, and a nozzle supported in said waste pipe and directed to discharge cleansing water inwardly through said second valve and inwardly through said ground coffee outlet port and said central openings of said lower apertured member and said lower screen means into said brewing chamber.

5. Apparatus according to claim 2, in which the upper of said screen means and the upper of said apertured members have enlarged openings concentric with said brewing chamber and leading to said ground coffee inlet port.

6. Apparatus according to claim 5, in which said upper screen means and said upper apertured member are convergingly upwardly sloped toward said enlarged openings.

7. Apparatus according to claim 6, in which the slope of said screen means and said upper apertured member is at such an angle as to define an annular expansion space of predetermined size above ground coffee in said brewing chamber when said brewing chamber has been gravity filled to said opening with dry ground coffee.

8. Apparatus according to claim 1, which includes a pair of gaskets respectively encircling said first and second members and sealing the outer peripheries of said water distribution and said infusion collection chambers from said brewing chamber, said gaskets frictionally engaging the interior of said housing and thereby holding said members in place.

9. Apparatus according to claim 1, in which said first and second valves comprise valve assemblies which are removably clamped as units to the ends of said housing.

10. Apparatus according to claim 1, in which each of said valves comprises a flat plate of sheet material slidable in its plane, and which includes a pair of circular seals having sealing engagement with said housing, respectively encircling said ground coffee ports, and respectively engageable with the sides of said flat plates which are directed toward said brewing chamber, and at least that one of said circular seals which seals the pressure at said water inlet port comprising a pair of concentric sealing surfaces engageable with said side of the adjacent plate.

11. Apparatus for making a coffee infusion from roasted ground coffee beans and water, comprising in combination:
(a) a housing having a pressurizable brewing chamber of predetermined size receptive of a predetermined volume of ground coffee;
(b) a ground-coffee inlet port disposed centrally at the top of said brewing chamber;
(c) a first valve communicating with said ground coffee inlet port and operative to control flow of ground coffee into said brewing chamber and to seal said ground coffee inlet port;
(d) a ground coffee outlet port leading from said brewing chamber remotely from said ground coffee inlet port;
(e) a second valve communicating with said ground coffee outlet port and operative to control flow of spent coffee grounds out of said brewing chamber and to seal said ground coffee outlet port;
(f) a water inlet port in said housing leading to water distribution means at one side of said chamber;
(g) an infusion outlet port in said housing connected to infusion collection means at the opposite side of said chamber;
(h) a waste pipe having a fluid-tight connection with said second valve and extending away from said housing for receiving spent coffee grounds from said second valve; and
(i) a nozzle supported in said waste pipe and directed for discharging cleansing water inwardly through said second valve and inwardly through said ground coffee outlet port into said brewing chamber.

References Cited

UNITED STATES PATENTS

| | | | |
|---|---|---|---|
| 2,619,413 | 11/1952 | Hill et al. | |
| 2,827,845 | 3/1958 | Richeson | 99—289 X |
| 2,955,527 | 10/1960 | Collins et al. | 99—289 X |
| 3,042,430 | 7/1962 | Guy | 285—365 |
| 3,053,168 | 9/1962 | Mills | 99—289 |
| 3,064,553 | 11/1962 | Simjian | 99—289 |
| 3,089,404 | 5/1963 | Parraga | 99—289 |
| 3,183,852 | 5/1965 | Fritz | 222—561 X |
| 3,224,358 | 12/1965 | Spielvogel | 99—278 |
| 3,253,534 | 5/1966 | Ross et al. | 99—289 |

WILLIAM I. PRICE, *Primary Examiner.*

WALTER A. SCHEEL, S. P. FISHER, *Examiners.*